Patented May 8, 1951

2,551,600

UNITED STATES PATENT OFFICE 2,551,600

PRESSURE-SENSITIVE ADHESIVE

William E. Holland, Plainfield, N. J., Charles Olson Pike, Sanford, N. C., and Emanuel S. Voutetakis, Paris, France, assignors to Industrial Tape Corporation, a corporation of New Jersey No Drawing. Original application November 22, 1944, Serial No. 564,730. Divided and this application November 10, 1948, Serial No. 59,412

7 Claims. (Cl. 260—41.5)

This invention relates to pressure-sensitive adhesives and to a method of making the same. More particularly, it relates to an adhesive suitable for use on pressure-sensitive adhesive tapes which are subjected to a wide variety of climatic conditions and to the high temperatures encountered in numerous industrial operations.

Adhesive masses employed in a multitude of hitherto known pressure-sensitive adhesive tapes use rubber or a similar highly temperature-sensitive elastomer as the cohesive constituent of the adhesive mass. Due to the temperature-sensitivity of these cohesive constituents, adhesive masses made therefrom show extreme softness at high temperatures and brittleness at low temperatures. Rubber adhesives, for instance, become soft at 80° to 100° C. They lose their cohesive strength at such temperatures with the result that they separate from the tape backing and flow beyond the extremities thereof, causing smudging of the underlying surface. This makes it necessary to remove the deposited material from the surface to which the tape has been applied in a special cleaning operation after removal of the tape itself.

At lower than normal temperatures, on the other hand, adjacent layers of adhesive sheeting, whether in the form of rolls or stacks, and when conventional rubber base adhesives are employed, will freeze together making it almost impossible to separate them for use. At still lower temperatures, rubber base adhesives lose their adhesive properties, rendering entirely useless the adhesive sheeting to which they are applied.

In accordance with the present invention there is provided an improved pressure-sensitive adhesive which uses as the adhesive constituent of the mass a vulcanized copolymer of an aliphatic isomono-olefin and a relatively minor amount of a diolefin, sufficient to give the copolymer unsaturation corresponding to an iodine number of from 1 to 2 per cent of the characteristic iodine number of natural rubber. This low amount of unsaturation is sufficient to allow vulcanization of the copolymer. The copolymers have a molecular weight of between 40,000 and 80,000 and are commonly known as "butyl" rubbers. Although satisfactory adhesives can be made from all butyl rubbers, those most likely to be used are copolymers of isobutylene and from 2 to 15% of a diolefin having a conjugated system of alternate single and double bonds, e. g., a butadiene including substitute butadienes such as isoprene, since such copolymers are commercially available in this and other countries.

Perhaps it should be pointed out that the improved elastomer is different from a mere mixture of a polyisomono-olefin and polymerized diolefin. The isobutylene in a mixture of the latter type cannot be cured whereas butyl rubber may be cured because of the residual unsaturation in the diolefin portion of the copolymer.

The improved pressure sensitive adhesive has excellent aging qualities. It ages better than adhesives made from polyisobutylene itself, which, according to the patent literature, have an aging life of two to ten times greater than adhesives made from natural rubber. The improved adhesive gives satisfactory service even after long storage. It has very little temperature sensitivity and can therefore be used with equal advantage in tapes designed for very high or very low temperature service. It will suffer substantially no deterioration in quality at temperatures as high as 150° C. and at least as low as −29° C. This improved adhesive is thus suitable for use in the aircraft, automotive, typewriter, and other machine industries where pressure-sensitive masking tapes have to withstand high temperature treatment of baked finishes and enamels. It may also be used in similar masking and decorating operations involved in the finishing of electrical, radion, and electronic equipment. The cold resistance of the adhesive is of great importance in connection with aircraft designed for high altitude flying and in packaging food and other perishables for long storage at low temperatures in the cold locker industry. Additional advantages are high resistance to oxidation and sunlight and impermeability to gases, the latter property being an important characteristic of the improved vulcanized butyl rubber adhesives. The adhesives are thus suitable for prolonged outdoor use and for application where a tight seal against gas penetration is important.

An adhesive made in accordance with the invention may include 24 to 76% butyl rubber, 10 to 46% of tackifying agent, up to 50% of filler of which at least 2% should be zinc oxide and curing agents in amounts varying from 0.5 to 5% based upon the amount of the butyl rubber, the percentages given being by weight. An optional addition of up to 35% of a plasticizer will soften the mass and improve its spreading and adhesive qualities.

Any compatible resin tackifier will serve as a tackifying agent. Such resin tackifiers are well known in the art and include, by way of example only, rosin or its derivatives, polymerized terpene resins, derivatives of pentaerythritol, coumarone-indene resins, petroleum resins, dammar resins, etc.

The preferred filler is zinc oxide although others may be used, such as titanium dioxide, iron oxide, hydrated alumina or clay, provided the above mentioned minimum percentage of zinc oxide is also present. Transparent adhesives may be made according to the present invention using the minimum amount of zinc oxide, or without any filler whatsoever in those cases where the cures do not rely upon sulfur or sulfur-bearing curing agents.

Among the suitable plasticizers that may be used are mineral oil, commercial petroleum hydrocarbon oils such as "Circo Light Oil," a product of the Sun Oil Company, which is largely alicyclic and consists principally of hydrocarbons containing 25 to 30 carbon atoms per molecule and one or more naphthenic or aromatic rings in the molecule, the non-volatile solvent oil sold by the Neville Company under the trade-mark "Nevinol" and which has a distillation range between 300 and 370° C., and the clear mobile hydrocarbon oil sold commercially by the Monsanto Chemical Company under the designation "HB-40" and which has a distillation range between 345 and 450° C.; the liquid chlorinated diphenyls; and a liquid coumarone-indene polymer sold by the Monsanto Chemical Company under the trade-mark "Tackol." A variety of other equally suitable plasticizers which also may be used will readily occur to anyone skilled in the art.

The amounts and types of curing agents may vary depending upon the exact consistency of the adhesive mixture and upon the resin used. Among the preferred curing agents are: quinoids (e. g. p-quinone dioxime) which are preferably used in combination with peroxides; organic or inorganic peroxides (e. g. benzoyl peroxide, t-butyl hydroperoxide, t-butyl peroxide, acetyl peroxide, lead dioxide, calcium peroxide or barium peroxide); thiazoles (e. g. 2 mercapto benzothiazole); thiuram sulfides (e. g. tetramethyl or tetraethyl thiuram disulfide, di-N-pentamethylene thiuram tetrasulfide); and the dithiocarbamates (e. g. amine salts such as n-pentamethylene ammonium pentamethylene dithiocarbamate, zinc salts such as zinc dimethyl dithiocarbamate, selenium salts such as selenium diethyl dithiocarbamate or complex mixtures of dithiocarbamates such as the one sold by the R. T. Vanderbilt Co. as "Butyl Eight"). Aldehyde-amine condensation products or guanidines may also be used, but these have been found to be relatively slow in connection with butyl rubber vulcanization.

The foregoing data will enable one skilled in the art to choose a cure which will properly vulcanize a butyl rubber adhesive in from ¼ to 3 hours. The cures are simple and easily controlled due to the extremely slow rate of vulcanization which is characteristic of butyl rubber. A series of cures which have proven particularly reliable are listed below by way of example only. The amounts given are percentages based on the butyl rubber or equivalent polyisomonoolefin-diolefin copolymer content of the compound:

| Curing Agent | Example of Cures | | | | |
|---|---|---|---|---|---|
| | A | B | C | D | E |
| p-quinone dioxime | 0.80 | 0.26 | | | |
| t-butyl hydroperoxide | 1.50 | | | | |
| Lead dioxide | | 0.38 | | | |
| 2-mercapto benzothiazole | | | 2.00 | | |
| Di-n-pentamethylene thiuram tetrasulfide | | | 2.00 | | |
| Zinc dibutyl dithiocarbamate | | | | 1.00 | 2.00 |
| Selenium diethyl dithiocarbamate | | | | 1.00 | 2.00 |
| Sulfur | | | | | |
| Approximate curing speed at 100° C. during constant mastication, hours | 0.3–1.5 | | 1 | –2.5 | |

In compounding the improved adhesive mass, it is preferred to incorporate the filler and the curing agent completely into the butyl rubber on a cold mill. The resin is then added and the composition mixed in a cold masticator for one hour, after which the temperature is raised, preferably above 90° C. and held for an appropriate period of time to effect a cure. Alternatively the butyl rubber compound including the filler and curing agents may be cured without mastication and then milled down to spreading consistency. The conditions of cure should be adjusted for minimum plasticity in keeping with the ability of the cured copolymer to form a solution of at least 20 per cent solids in straight aliphatic solvents such as normal heptane. The improved adhesive may be spread upon a backing material to produce a pressure sensitive adhesive tape from solutions of that character. In general, lower solubilities are necessary where hot spreading is substituted for solvent spreading although the latter method is preferred.

The presence of at least a small amount of zinc oxide is necessary in all of the above mentioned examples of cures, except Examples A and B which do not rely on sulfur for vulcanization. The preferred range of constituents for vulcanized butyl rubber adhesives has been stated. The following specific examples falling within the given range are illustrative of the various compounding procedures that may be used. All proportions are by weight:

*Example 1*

| | Per cent |
|---|---|
| Butyl rubber | 37.5 |
| Zinx oxide | 37.5 |
| Nevillite #123 | 12.5 |
| "Circo Light Oil" | 12.5 |

*Example 2*

| | Per cent |
|---|---|
| Butyl rubber | 30 |
| Zinc oxide | 30 |
| Glycerol ester of hydrogenated rosin | 20 |
| Mineral oil | 20 |

*Example 3*

| | Per cent |
|---|---|
| Butyl rubber | 30 |
| Zinc oxide | 10 |
| Titanium dioxide | 17 |
| "Polypale Resin" | 23 |
| "Circo Light Oil" | 20 |

Example 4

| | Per cent |
|---|---|
| Butyl rubber | 31 |
| Zinc oxide | 27 |
| Glycerol ester of hydrogenated rosin | 25 |
| "Circo Light Oil" | 17 |

Example 5

| | Per cent |
|---|---|
| Butyl rubber | 49 |
| Glycerol ester of hydrogenated rosin | 25 |
| "Circo Light Oil" | 26 |

It will be understood that each of the formulas given in Examples 1 to 5 requires a cure which may be selected from the proup of cures A to E previously referred to, although any suitable cure will suffice. If cure A is used with the formula given in Example 5, a butyl rubber adhesive having inherent transparency will result and which, therefore, may be used for tapes having transparent backings. Substantially transparent adhesives may also be made using, for instance, cures C, D, and E, provided the butyl rubber formula contains only a small amount of zinc oxide.

As a further identification of certain of the constituents mentioned in the examples, it should perhaps be stated that "Nevillite #123" is a coumarone-indene resin, sometimes referred to as a cycloparaffin and having a melting point approximately 115° C. It is manufactured by the Neville Co. A suitable glycerol ester of hydrogenated rosin is sold by Hercules Powder Co., under the name "Staybelite Ester #10." "Polypale Resin" is a rosin derivative, regarded as a dipolymer of abietic acid and is like wise sold by Hercules Powder Co. "Circo Light Oil" has been identified heretofore.

The invention has been described with reference to its preferred embodiments although many modifications thereof are included within its spirit. The invention, therefore, is limited only by prior art and the scope of the appended claims.

This application is a division of application Serial No. 564,730, filed by the same inventors on November 22, 1944, and now abandoned.

The claims are:

1. For an adhesive tape, a pressure-sensitive adhesive mass consisting of a cohesive constituent including a cured copolymer of isobutylene and from about two to about fifteen per cent by weight of a butadiene, said mass also consisting of, on a weight basis, from about ten to about forty-six per cent compatible resin up to about thirty five per cent of compatible plasticizer, and up to about fifty per cent filler, said copolymer being cured to the range providing substantially minimum plasticity consistent with a solubility of the order of about twenty per cent in straight aliphatic solvent of the normal heptane type.

2. For an adhesive tape, a pressure-sensitive adhesive mass according to claim 1 in which the filler contains zinc oxide to the extent of not less than about two per cent by weight of the adhesive mass.

3. For an adhesive tape, a pressure-sensitive adhesive mass according to claim 1, wherein the copolymer has a molecular weight between about 40,000 and about 80,000.

4. In an adhesive tape, a pressure-sensitive transparent adhesive mass consisting of a cohesive constituent including a cured initially slightly unsaturated elastomeric copolymer of isobutylene and diolein, which has a degree of vulcanization in the range providing substantially minimum plasticity consistent with a solubility of the order of about 20 per cent in straight aliphatic solvent of the normal heptane type, and from about ten to from about forty-six per cent compatible tackifier.

5. For an adhesive tape, a pressure-sensitive adhesive mass according to claim 4, wherein the copolymer has a molecular weight between about 40,000 and about 80,000.

6. In an adhesive tape, a pressure-sensitive transparent adhesive mass consisting of a cohesive constituent including a cured, initially slightly unsaturated, elastomeric copolymer of isobutylene and an amount of diolefin providing unsaturation of the copolymer corresponding to an iodine number of from about one to about 2 per cent of the characteristic iodine number of natural rubber, which cohesive constituent has a degree of vulcanization in the range providing substantially minimum plasticity consistent with a solubility of the order of about 20 per cent in straight aliphatic solvent of the normal heptane type, from about 10 to about 46 per cent by weight of the adhesive mass of compatible tackifier, and a minor portion of liquid plasticizer comprising not more than about 35 per cent.

7. For an adhesive tape, a pressure-sensitive adhesive mass according to claim 6, wherein the copolymer has a molecular weight between about 40,000 and about 80,000.

WILLIAM E. HOLLAND.
CHARLES OLSON PIKE.
EMANUEL S. VOUTETAKIS.

No references cited.